United States Patent
Epaud

(10) Patent No.: US 7,328,929 B2
(45) Date of Patent: Feb. 12, 2008

(54) VEHICLE SEAT AND A VEHICLE PROVIDED WITH SUCH A SEAT

(75) Inventor: David Epaud, Cerny (FR)

(73) Assignee: Faurecia Sieges d'Automobile S.A., Hanterre (FR)

( * ) Notice: Subject to any disclaimer, the term of this patent is extended or adjusted under 35 U.S.C. 154(b) by 158 days.

(21) Appl. No.: 11/134,661

(22) Filed: May 20, 2005

(65) Prior Publication Data

US 2005/0269830 A1    Dec. 8, 2005

(30) Foreign Application Priority Data

May 26, 2004    (FR) .................................. 04 05685

(51) Int. Cl.
*B60N 2/02* (2006.01)

(52) U.S. Cl. .................... 296/65.09; 297/331; 297/353

(58) Field of Classification Search ............ 296/65.05, 296/65.09, 65.16; 297/325, 331, 334, 335, 297/353

See application file for complete search history.

(56) References Cited

U.S. PATENT DOCUMENTS 4,925,228 A    5/1990 Pipon et al.
5,482,349 A    1/1996 Richter et al.
6,000,742 A    12/1999 Schaefer et al.
6,676,216 B1   1/2004 Freijy et al.
6,742,743 B2 * 6/2004 Saint-Jalmes ........... 244/122 R

FOREIGN PATENT DOCUMENTS

| DE | 19958676 | 2/2001 |
|---|---|---|
| DE | 10354272 | 6/2005 |
| EP | 0622268 | 11/1994 |
| FR | 2845649 | 4/2004 |
| FR | 2845954 | 4/2004 |

OTHER PUBLICATIONS

French Preliminary Search Report dated Dec. 10, 2004 received in French patent application No. FR 0405685.

* cited by examiner

*Primary Examiner*—Joseph D. Pape
(74) *Attorney, Agent, or Firm*—Marshall, Gerstein & Borun LLP

(57) ABSTRACT

The vehicle seat comprises a seat back, a seat proper, and a support mounted on a vehicle floor. The seat proper is connected to the support via a front link leg. The seat back is connected to the support via a rear link leg and via an intermediate link leg. A rear portion of the seat proper is mounted to pivot relative to the seat back.

9 Claims, 4 Drawing Sheets

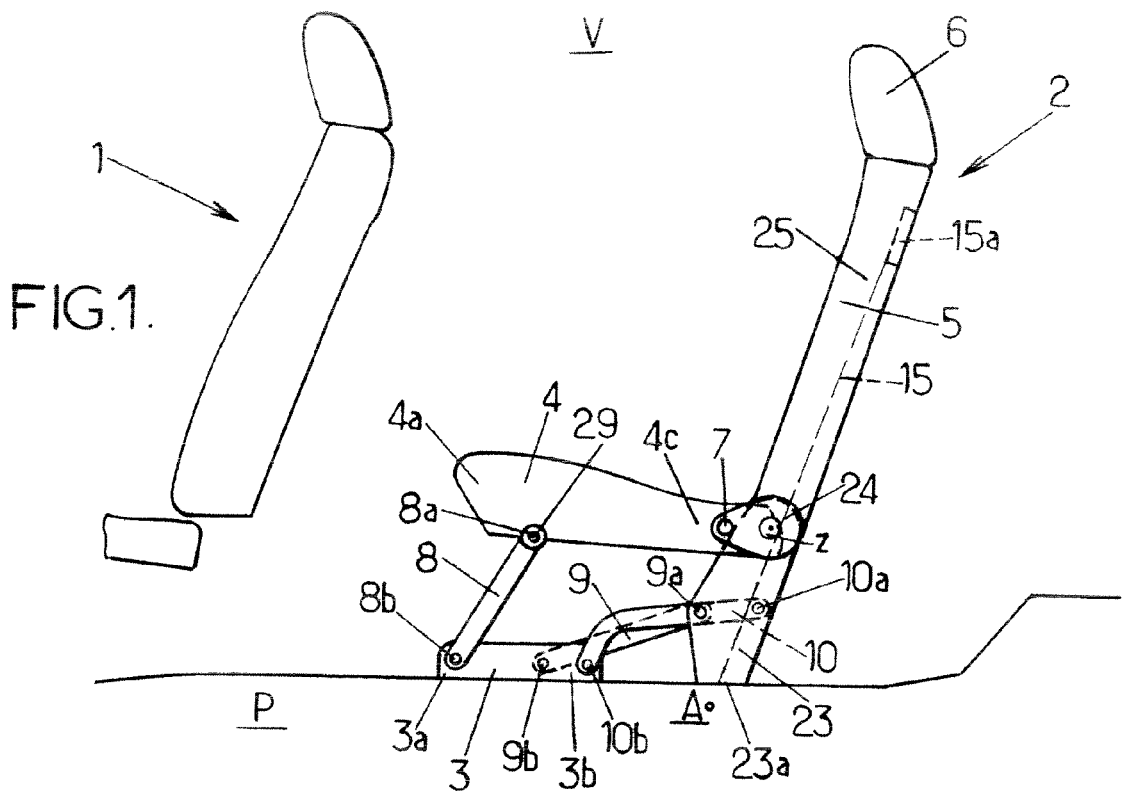
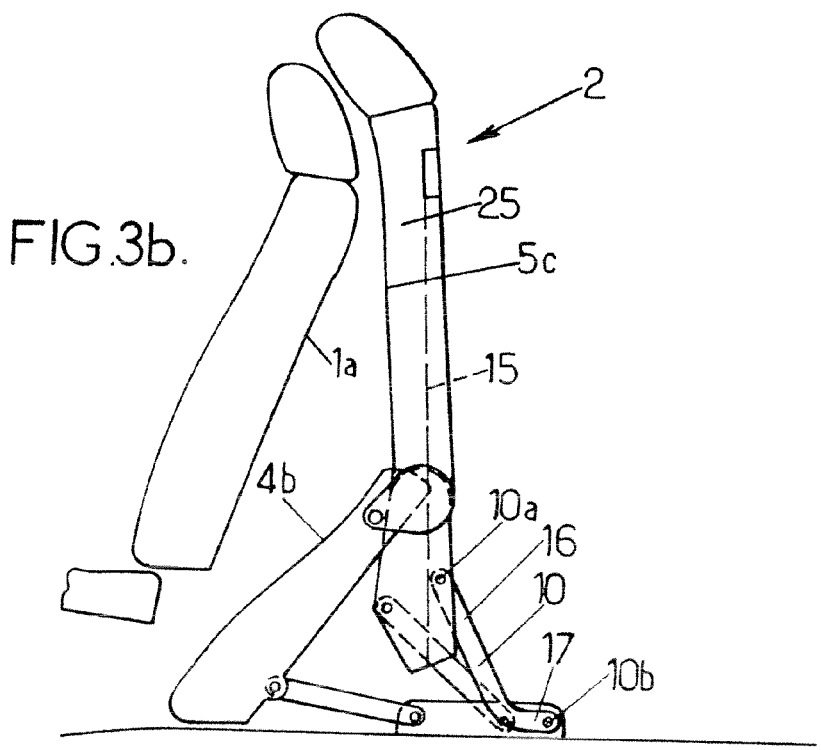

US 7,328,929 B2

VEHICLE SEAT AND A VEHICLE PROVIDED WITH SUCH A SEAT

FIELD OF THE INVENTION

The present invention relates to vehicle seats and to vehicles equipped with such seats.

More particularly, the invention relates to a vehicle seat comprising a seat back, a seat proper having a rear portion, and a support designed to be mounted on a vehicle floor;
the seat proper being connected to the support via a front link leg having a first end pivotally mounted on the seat proper and a second end pivotally mounted on said support;
the seat back being connected to the support via:
a rear link leg having a first end pivotally mounted on the seat back and a second end pivotally mounted on said support; and via
an intermediate link leg having a first end pivotally mounted on the seat back and a second end pivotally mounted on said support;
the seat further comprising an anchor device adapted alternately to hold at least two components of the seat, chosen from the support, the seat proper and the seat back, stationary relative to each other, and to release them.

BACKGROUND OF THE INVENTION

Document FR 2 845 649 describes an example of such a vehicle seat, used as a back seat, in which it is possible to facilitate access to the space situated behind the seat by causing the seat back to move forwards as a whole. This makes it possible, for example, to store objects substantially vertically behind the seat back or to access a further row of seats. However, to bring the seat rearwards again, it is necessary to act in two stages, firstly by bringing the seat back rearwards, and secondly by bringing the seat proper rearwards, which is particularly difficult if the person bringing the seat rearwards again is seated on the further row of seats.

OBJECTS AND SUMMARY OF THE INVENTION

An object of the present invention is to mitigate those drawbacks.

To this end, according to the invention, in a seat of the type in question, said rear portion of the seat proper is mounted to pivot relative to the seat back.

By means of these provisions, it is possible to implement a vehicle seat in which it is possible, in a single movement, to move the seat forwards to access the space situated behind it, or to bring it rearwards again.

In preferred embodiments of the invention, it is optionally possible to use one or more of the following provisions:
the anchor device comprises an anchor member carried by the seat back and a fastening member that is stationary relative to said support, said anchor member and said fastening member being suitable for selectively co-operating to fasten said seat back to said support, or to be released so as to allow said seat back and said support to move relative to each other;
in an in-use position, the anchor device is adapted to hold together said two components of the seat chosen from the support, the seat proper, and the seat back, the seat proper and the seat back forming a first angle in said in-use position, the seat further having a brought-forwards position, in which said seat is disposed mainly forwards relative to said in-use position, the seat proper and the seat back forming a second angle in said brought-forwards position;
the second angle, formed between the seat proper and the seat back in the brought-forwards position being greater than the first angle, formed between the seat proper and the seat back in the in-use position;
drive means are adapted to act on said seat, in its in-use position, to urge it towards its brought-forwards position;
the first and second ends of the front, rear, and intermediate link legs are pivotally mounted;
the rear link leg has a first branch having a first end that carries said first end of the rear link leg, and a second branch having a first end that carries said second end of the rear link leg, said first and second branches being connected together at their second ends, forming a non-zero angle, said angle facing mainly rearwards in said brought-forwards position;
the seat back comprises a backrest portion and a base, said rear link leg and said intermediate link leg having their first ends mounted on said base; said backrest portion is pivotally mounted on the base to pivot between an in-use position and a folded-down position in which said backrest portion is mainly tilted forwards; said seat including a locking member adapted for selectively allowing said backrest portion to pivot relative to said base or preventing said backrest portion from pivoting relative to said base; and
said backrest portion is pivotally mounted on said base via at least one hinge comprising a first cheek plate mounted on the backrest portion and a second cheek plate mounted on said base and adapted to turn relative to said first cheek plate.

In another aspect, the invention provides a vehicle including such a seat and a floor carrying said support.

In a particular embodiment, it is possible also to use the following provision:
said seat back has a seat back front face, said seat proper having a seat proper top face;
said vehicle further including a front seat situated in front of said back seat, and having a front seat rear face;
said seat back front face and said seat proper top face coming substantially into contact with said rear face of the front seat when the back seat is in its brought-forwards position.

BRIEF DESCRIPTION OF THE DRAWINGS

Other characteristics and advantages of the invention will appear on reading the following description of an embodiment thereof, given by way of non-limiting example, and with reference to the accompanying drawings.

In the drawings:

FIG. 1 is a diagrammatic side view of a vehicle seat of the invention in its in-use position;

FIG. 3b is a diagrammatic side view of the seat of FIGS. 1 and 3a in a brought-forwards position.

MORE DETAILED DESCRIPTION

Figure 2B:
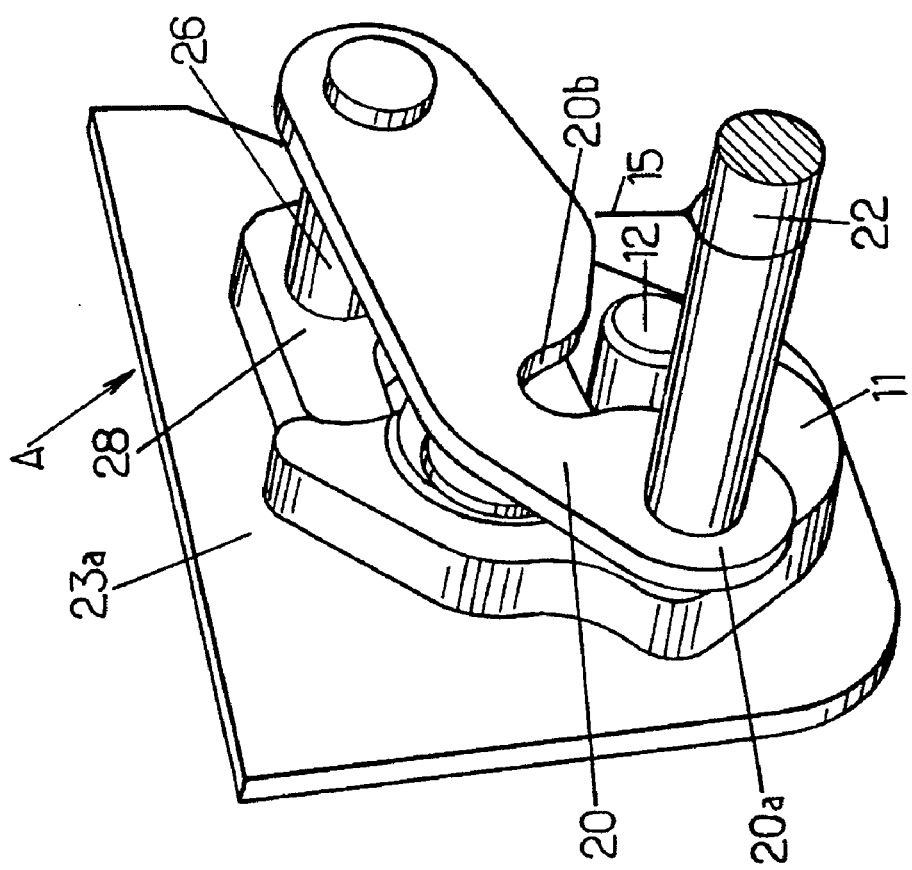
FIGS. 2a and 2b are diagrammatic perspective views showing the mechanism for anchoring the seat back.

In the various figures, like references are used for elements that are identical or similar.

FIG. 1 is a diagrammatic side view showing the inside of a motor vehicle V having a front row of seats 1 including, for example, a seat in which the driver of the vehicle can sit, and a back row of seats 2 situated behind the front row of seats 1, and made up, for example, of a plurality of individual seats or of a bench seat extending over all or some of the width of the vehicle.

An embodiment illustrating the vehicle seat of the invention is presented below with reference to the back seat 2 of FIG. 1, but the invention is also applicable to a vehicle front seat, such as the seat 1, to a seat in a third row of vehicle seats (not shown) disposed behind the back seat 2, or to some other seat. The invention is also applicable regardless of whether the seat is a bench seat or an individual seat.

The seat 2 of the invention is mounted on the floor P of the vehicle via a support 3 which can be a separate part mounted on the floor of the vehicle, or else formed integrally with the floor of the vehicle. Alternatively, the support 3 can be mounted on a runner making it possible for the position of the seat to be adjusted longitudinally. In relatively conventional manner, the seat 2 comprises a seat proper 4 preferably adapted to receive the pelvis and the legs of an occupant (not shown) of the seat, and extending from a front portion 4a to a rear portion 4c. The seat 2 further comprises a seat back 5, the seat back comprising a backrest portion 25 serving to receive mainly the back of the occupant of the seat in question, and optionally supplemented with a headrest 6, and a base 23 mounted on the floor P of the vehicle. The base 23 is secured to the backrest portion, or mounted to pivot relative thereto, e.g. via a hinge 24 of a type known per se, and comprising a first cheek plate mounted on the base 23 and a second cheek plate mounted on the backrest portion 25, and that can turn about a pivot axis z associated with the first cheek plate. Such a hinge can conventionally be locked to prevent such pivoting, or unlocked to allow such pivoting.

In the embodiment in question, the rear portion 4c of the seat proper 4 is coupled to the backrest portion of the seat back 5 via a pivot coupling shown, in this example, in the form of a pivot 7. For example, provision can be made for fingers, carried by a rigid framework constituting the rigid structure of the seat back 5 to turn freely in openings provided in the rigid framework (not shown) of the seat proper 4. The coupling is not necessarily a pivot coupling, and the fingers in question can optionally also be slidably received in the openings in question. The pivot coupling via which the seat back is pivotally coupled to the seat proper is not necessarily formed in this manner, and it can be implemented in any suitable alternative manner.

At its front end 4a, the seat proper 4 is supported by a front link leg 8, e.g. a linear link leg, extending between a first end 8a mounted to pivot on the front end 4a of the seat proper 4, and a second end 8b mounted to pivot on a front portion 3a of the support 3. These pivot couplings are, for example, implemented by pivots.

The base 23 of the seat is connected to a rear portion 3b of the support 3 via a linear intermediate link leg 9 extending between a first end 9a situated in a front bottom portion of the base, and, in particular under the pivot 7 connecting the seat proper to the seat back, and a second end 9b connecting rotatively the intermediate link leg 9 to the support 3 in its rear portion 3b. The pivot couplings in question are, for example, pivots. The base 23 is also connected to the rear portion 3b of the support 3 via a substantially L-shaped rear link leg 10 extending between a first end 10a mounted to pivot on a rear bottom portion of the base 23, and a second end 10b mounted to pivot on the rear portion 3b of the support 3, e.g. behind the second end 9b of the intermediate link leg 9.

The rear link leg 10 is substantially L-shaped having a first branch 16 carrying the first end of the rear link leg 10a and a second branch 17 carrying the second end 10b of the rear link leg 10, the first and second branches 16 and 17 forming an obtuse angle that faces towards the floor on which the seat 2 is mounted when the seat is in the in-use position as shown in FIG. 1.

In the embodiment shown, the intermediate link legs 9 are also situated between the rear link legs 10 along the transverse axis of the seat (axis orthogonal to the section plane). For example, the second ends 9b of the intermediate link legs 9 are fastened to the supports 3 on the faces of the supports 3 that are opposite from the faces that receive the second ends 10b of the rear link legs 10. At least one intermediate link leg 9 can also carry a fastening stud 18 (FIG. 3).

In order to hold the seat back in its in-use position as shown in FIG. 1, in which an occupant can sit in the seat, it is possible to make provision to equip one of the pivots 7, 8a, 8b, 9a, 9b, 10a, 10b with a hinge known per se that can either be locked to lock the relative position of the elements of the seat, or unlocked to allow the elements of the seat to move relative to one another.

Figure 2A:
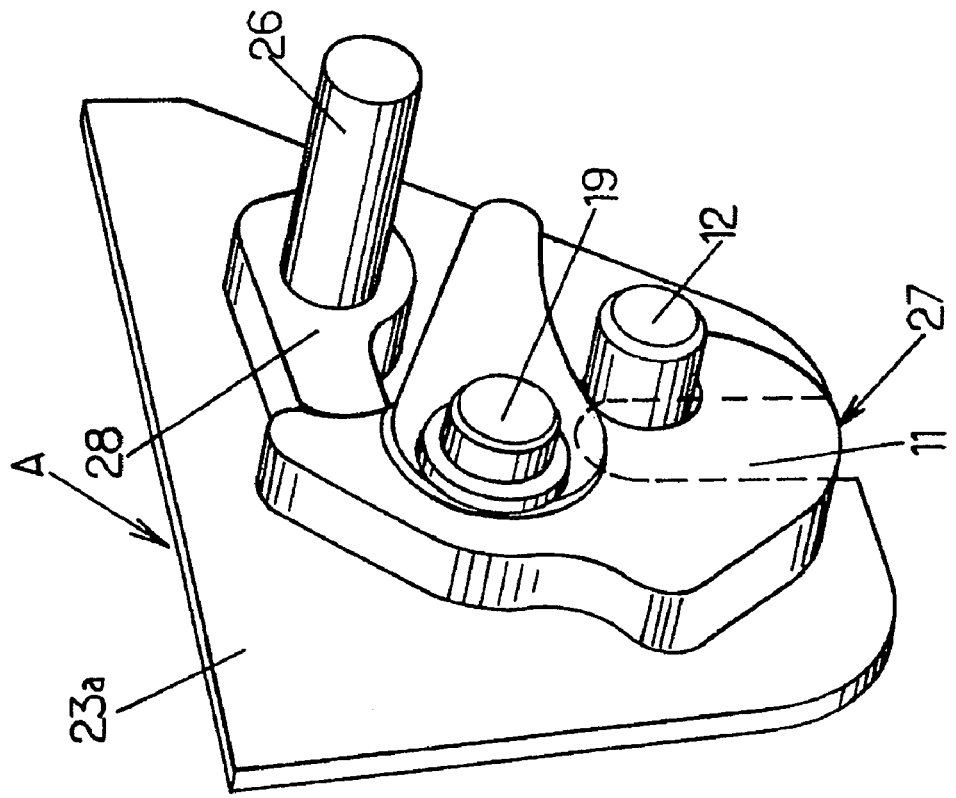

In the embodiment presented, such a hinge is not used, but rather the bottom end 23a of the base 23 is anchored in the floor P of the vehicle by an anchor device A shown in FIGS. 2a and 2b. The anchor device A comprises a hook 11 mounted to pivot via a pivot 19 on the bottom portion 23a of the base. Said hook 11 hooks onto a fastening member 12 which, for example, is in the form of a transverse rod extending, for example, through the bottom portion 23a and fastened to the floor P (or to the runner).

A torsion spring (not shown) tends to release the hook 11 from the rod 12. However, a cam 28 mounted to pivot on the bottom portion 23a of the base 23 holds the hook 11 in the locked position in which it is locked onto the rod 12.

The cam 28 is constrained to pivot with a shaft 26 pivotally mounted in the bottom portion 23a of the base 23. The shaft 26 also carries a hook 20 constrained to pivot with it. Said hook 20 can be provided with a notch 20b that co-operates with the rod 12 in the locked position. At one end 20a of the hook 20, a rod 22 carries the second end of a cable 15 connected to a handle.

When the handle is actuated by a user, the cable 15 urges the hook 20 to turn counterclockwise as shown in FIG. 2b. Since they are constrained to pivot with the hook 20, the rod 26 and the cam 28 also turn, thereby releasing the cam 28 from the hook 11. Under the action of the spring, the hook 11 is released from the fastening member 12. The base 23 carrying the hooks 11 and 20 is released from fastening member 12 via the notch 27 provided in the bottom portion of the base 23. The seat is then free to be moved towards a brought-forwards position.

The above description is an illustrative example. Any other type of anchoring compatible with the safety standards relating to this type of device and that can be released easily by a user can be used within the ambit of the invention.

Figure 3A:
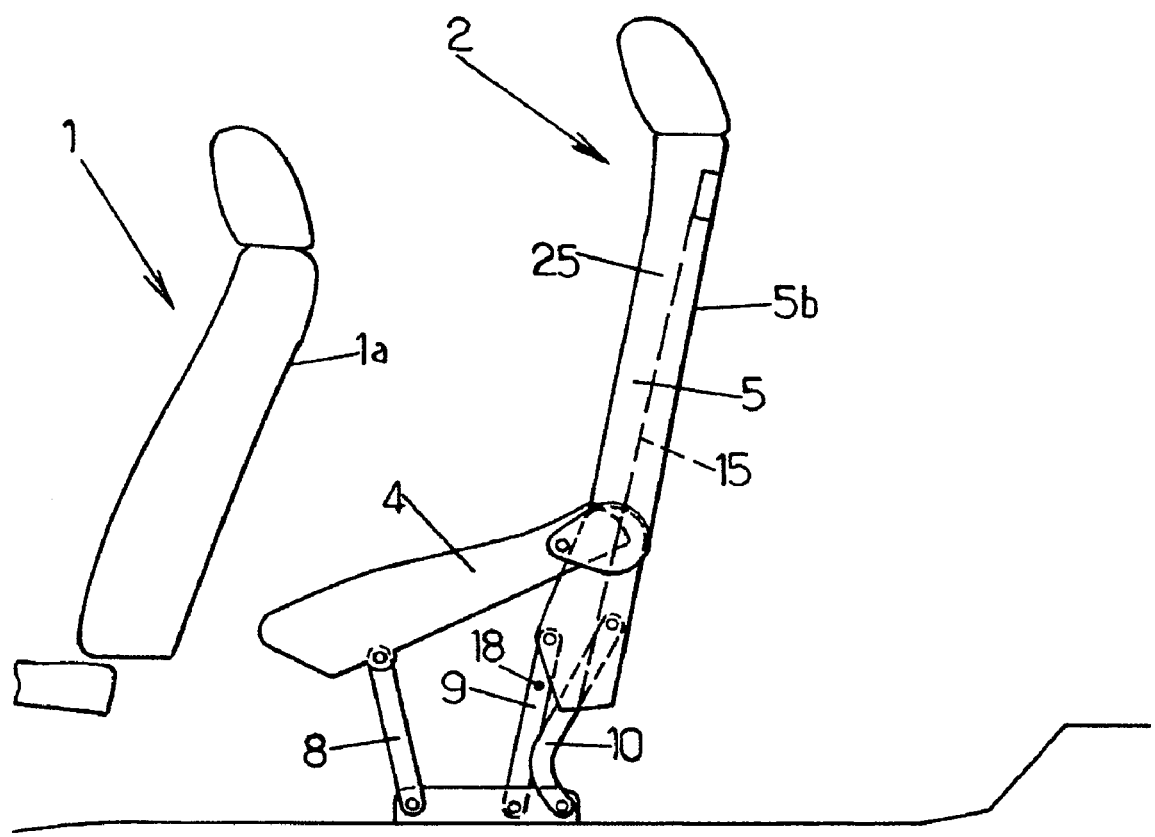
FIG. 3a is a diagrammatic side view of the seat of FIG. 1, in an intermediate position.

As shown in FIGS. 3a and 3b, the seat in question greatly facilitates access to the space situated behind the seat 2. Once the anchoring A is released by the user, either directly, or by acting on the handle, the user can bring the seat forwards by causing the seat back to pivot mainly forwards, e.g. by pressing on the rear face 5b of the seat back. This forward movement is accompanied by a generally upward movement of the seat back towards the top, the intermediate link legs 9 and the rear link legs 10 moving from a substantially horizontal position to a substantially vertical position as the seat goes from the rest position shown in FIG. 1 to the intermediate position shown in FIG. 3. The fact that the seat proper 4 is pivotally mounted on the seat back 5 ensures that the seat proper also moves forwards. During this movement, due to the positions and to the respective lengths of the front link legs 8, of the intermediate link legs 9, and of the rear link legs 10, the angle formed between the seat back and the seat proper increases going from the rest position shown in FIG. 1 to the brought-forwards position shown in FIG. 3b, in which the seat back and the seat proper form an angle between them that is obtuse, and that enables the seat 2, when it is a back seat, almost to fit the profile of the rear of the front seat 1. The angle formed by the L-shaped rear link leg 10 then faces towards the rear of the seat 2.

These provisions thus make it possible to optimize access to the space situated behind the seat 2, because the front face 5c of the seat back and the top face 4b of the seat proper almost fit the seat 1, thereby minimizing the space wasted when accessing the space situated behind the seat 2. In addition, this movement is achieved merely by a single action by the user. If a third row of seats is disposed behind the seat 2, it is thus easy to go and sit in such a seat, or easy to alight from the vehicle without bumping into anything. If the space situated behind the seat 2 is a storage-space, it is thus possible to load voluminous objects through the side doors.

The seat 2 can be in equilibrium in the brought-forwards position shown in FIG. 3b. It can also be urged towards this position, from the in-use position shown in FIG. 1, by drive means 29 such as a torsion spring mounted on one of the above-mentioned pivot couplings, which makes it even easier for the user to move the seat from its in-use position to its brought-forwards position. Alternatively, the seat 2 can be out of equilibrium in the brought-forwards position shown in FIG. 3b and can be held in that position by a fastening mechanism retaining the seat in said brought-forwards position. To this end, it is possible to make provision for the recess 20b then to latch over the stud 18 carried by the intermediate link leg 9, so as to hold the seat in that position. Alternatively, the seat can merely be held by the user in said brought-forwards position while the user is accessing the space situated behind the seat 2 or is alighting from the vehicle.

The seat as a whole returns to its in-use position in a single movement, imparted by the user against the torsion spring if any, due to the coupling between the seat proper and the seat back. By releasing the handle, the cam 28 locks the hook 11 onto the rod 12 again.

Figure 4A:
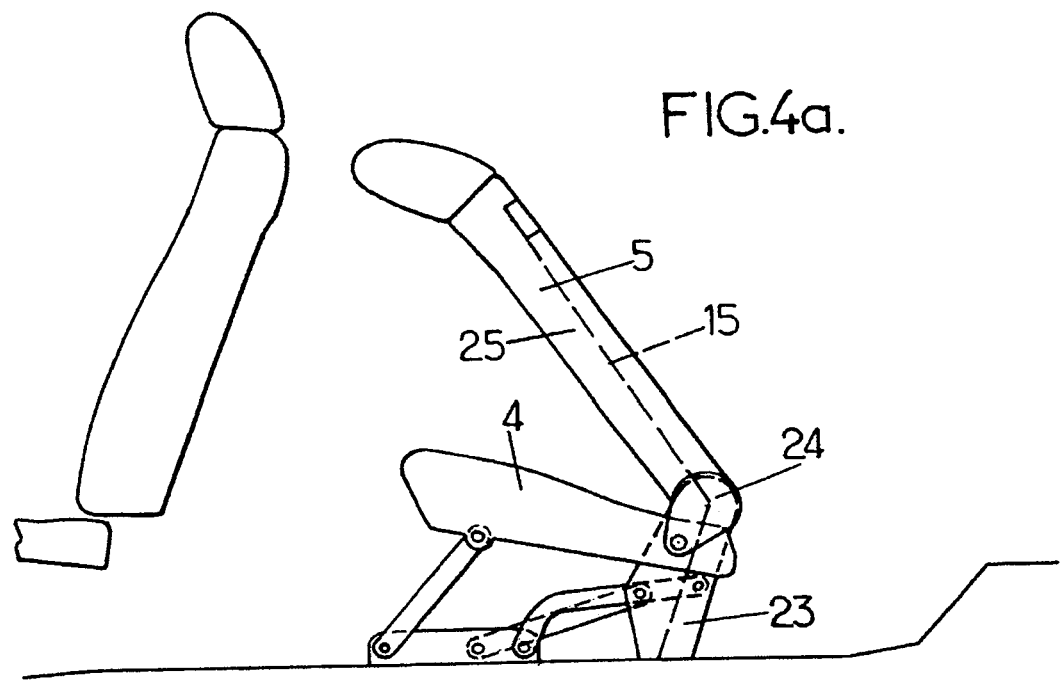
FIGS. 4a and 4b are diagrammatic side views of the seat respectively in a tilted-forwards position and in a folded-down position.
Figure 4B:
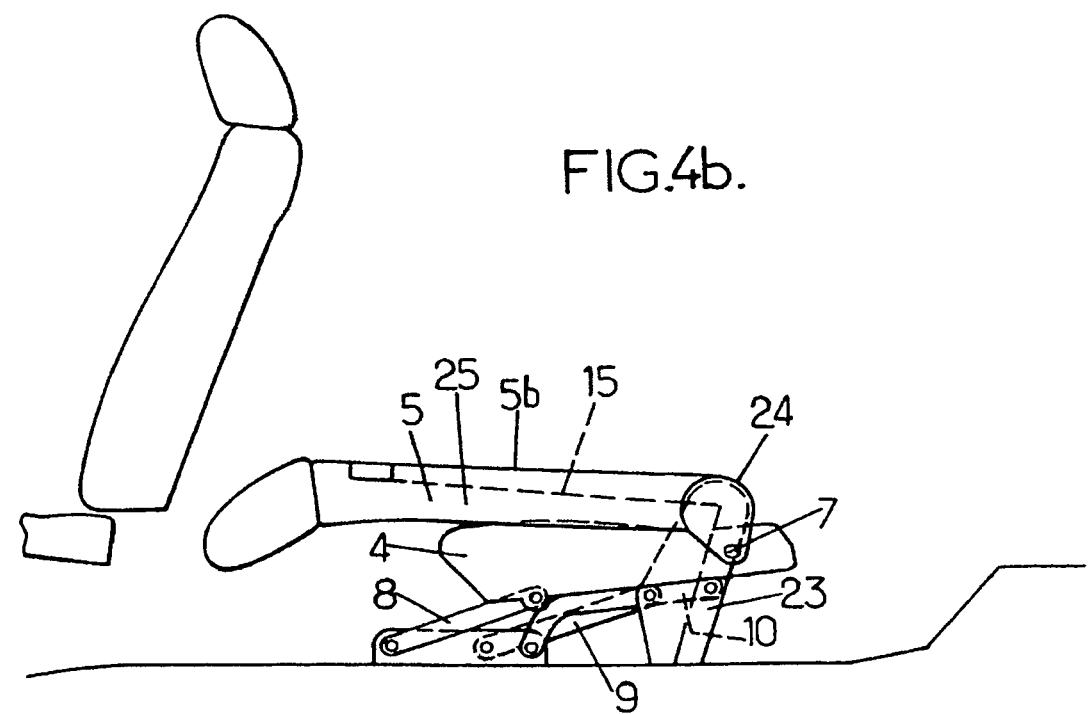

As shown in FIGS. 4a and 4b, such a seat in which the backrest portion is mounted to pivot relative to the base can be used to increase the storage volume in the vehicle by folding down the seat back onto the seat proper.

By activating the above-described handle, or another handle, a user unlocks the hinge 24 between the backrest portion 25 and the base 23. The backrest portion 25 is then free to pivot relative to the base, e.g. forwards, as shown in FIG. 4a, into a tilted-forwards position. This pivoting can be facilitated by a torsion spring at the hinge 24.

Due to the fact that the rear portion 4c of the seat proper 4 can pivot relative to the seat back, said seat back undergoes a mainly rearward and downward movement while the seat back 5 is being folded down, as can be seen mainly in FIG. 4b. The front link legs 8 lie down during this movement. Thus, in a single movement, after unlocking a single locking mechanism, it is possible to place the seat in a folded-down position in which the rear face of the seat back forms a substantially plane storage surface.

It is possible to provide an abutment so that the folded-down position of the seat corresponds to a forward tilt, e.g. of approximately in the range 20° to 60°, or alternatively it is possible to make provision for the rear face 5b of the seat back, in the folded-down position, to form a horizontal storage floor, the front face 5a of the seat back then resting on the seat proper.

The seat as a whole can easily be brought back into its in-use position by returning the seat back rearwards in a single movement, the seat proper, which is connected to the seat back, then following the seat back during this movement.

What is claimed is:

1. A vehicle seat comprising a seat back, a seat proper having a rear portion, and a support designed to be mounted on a vehicle floor;
   the seat proper being connected to the support via a front link leg having a first end pivotally mounted on the seat proper and a second end pivotally mounted on said support;
   the seat back being connected to the support via:
   a rear link leg having a first end pivotally mounted on the seat back and a second end pivotally mounted on said support; and via
   an intermediate link leg having a first end pivotally mounted on the seat back and a second end pivotally mounted on said support;
   the seat further comprising an anchor device adapted alternately to hold at least two components of the seat, chosen from the support, the seat proper and the seat back, stationary relative to each other, and to release them;
   wherein said rear portion of the seat proper is mounted directly on the seat back to pivot relative to the seat back.

2. A seat according to claim 1, in which the anchor device comprises an anchor member carried by the seat back and a fastening member that is stationary relative to said support, said anchor member and said fastening member being suitable for selectively co-operating to fasten said seat back to said support, or to be released so as to allow said seat back and said support to move relative to each other.

3. A seat according to claim 1, in which the first and second ends of the front, rear, and intermediate link legs are pivotally mounted.

4. A seat according to claim 1, in which the seat back comprises a backrest portion and a base, said rear link leg and said intermediate link leg having their first ends mounted on said base;
   in which said backrest portion is pivotally mounted on the base to pivot between an in-use position and a folded-down position in which said backrest portion is mainly tilted forwards;
   said seat including a locking member adapted for selectively allowing said backrest portion to pivot relative to said base or preventing said backrest portion from pivoting relative to said base.

5. A vehicle including a seat according to claim 1, and a floor carrying said support.

6. A vehicle seat comprising a seat back, a seat proper having a rear portion, and a support designed to be mounted on a vehicle floor;

the seat proper being connected to the support via a front link leg having a first end pivotally mounted on the seat proper and a second end pivotally mounted on said support;

the seat back being connected to the support via:

a rear link leg having a first end pivotally mounted on the seat back and a second end pivotally mounted on said support; and via an intermediate link leg having a first end pivotally mounted on the seat back and a second end pivotally mounted on said support;

the seat further comprising an anchor device adapted alternately to hold at least two components of the seat, chosen from the support, the seat proper and the seat back, stationary relative to each other, and to release them;

wherein said rear portion of the seat proper is mounted to pivot relative to the seat back; and further wherein:

when in an in-use position, the anchor device is adapted to hold together said at least two components of the seat chosen from the support, the seat proper, and the seat back, the seat proper and the seat back forming a first angle in said in-use position, the seat further having a brought-forwards position, in which said seat is disposed mainly forwards relative to said in-use position, the seat proper and the seat back forming a second angle in said brought-forwards position;

the second angle, formed between the seat proper and the seat back in the brought-forwards position being greater than the first angle, formed between the seat proper and the seat back in the in-use position.

7. A seat according to claim 6, further comprising drive means adapted to act on said seat, in its in-use position, to urge it towards its brought-forwards position.

8. A seat according to claim 6, in which the rear link leg has a first branch having a first end that carries said first end of the rear link leg, a second branch having a first end that carries said second end of the rear link leg, said first and second branches being connected together at their second ends, forming a non-zero angle, said angle facing mainly rearwards in said brought-forwards position.

9. A vehicle including the vehicle seat according to claim 6, wherein the vehicle seat is a back seat, said seat back having a seat back front face, the seat proper having a seat proper top face;

said vehicle further including a front seat situated in front of said back seat, and having a front seat rear face;

said seat back front face and said seat proper top face substantially fitting a profile of said rear face of the front seat when the back seat is in its brought-forwards position.

* * * * *